United States Patent [19]

Norwich

[11] Patent Number: 4,750,199
[45] Date of Patent: * Jun. 7, 1988

[54] COORDINATED MULTIPLE TELEPHONE STATION SYSTEM

[75] Inventor: Daniel Norwich, Tampa, Fla.

[73] Assignee: Telecredit, Inc., Los Angeles, Calif.

[ * ] Notice: The portion of the term of this patent subsequent to Dec. 22, 2004 has been disclaimed.

[21] Appl. No.: 106,488

[22] Filed: Oct. 9, 1987

Related U.S. Application Data

[63] Continuation of Ser. No. 868,464, May 30, 1986, Pat. No. 4,715,061.

[51] Int. Cl.⁴ ............................................. H04M 1/57
[52] U.S. Cl. ......................................... 379/91; 379/93; 235/380; 235/381
[58] Field of Search ...................... 379/90, 91, 93, 144; 235/375, 380, 381, 385

[56] References Cited

U.S. PATENT DOCUMENTS

| | | | |
|---|---|---|---|
| 3,920,908 | 11/1975 | Kraus | 379/91 |
| 4,439,636 | 3/1984 | Newkirk et al. | 379/91 |
| 4,521,644 | 6/1985 | Bernard, Jr. | 379/90 |
| 4,630,200 | 12/1986 | Ohmae et al. | 364/405 |
| 4,634,809 | 1/1987 | Paulsson et al. | 379/91 |
| 4,715,061 | 1/1988 | Norwich | 379/91 |

Primary Examiner—Robert Lev
Attorney, Agent, or Firm—Nilsson, Robbins, Dalgarn, Berliner, Carson & Wurst

[57] ABSTRACT

A system incorporating a cluster of several telephone stations or terminals to interface with one or more frequently called remote data stations for economy of dial-up connection in accommodating communication with multiple terminals of the cluster during a single call to a remote station. With a call from one terminal to a remote data station, a transmit-receive unit interfaces the cluster with the data station setting the terminals in the cluster in a polling sequence to accommodate additional communications. The system preserves an "off-hook" state polling the individual terminals in the cluster to accommodate further communication from the cluster terminals to the central data station. Polling is facilitated by a cluster counter in the transmit-receive unit coordinated with logic indicating the state of each terminal in the cluster.

8 Claims, 4 Drawing Sheets

| TERM. | CL. | STATION | CARD NO. | INQ. | INQUIRY CODE |
|---|---|---|---|---|---|
| AB | 5 | 277-621-4835 | 4476534 2179 | 01 | RL57 |
| AB | CL. | ST. | CN. | IQ. | ID |

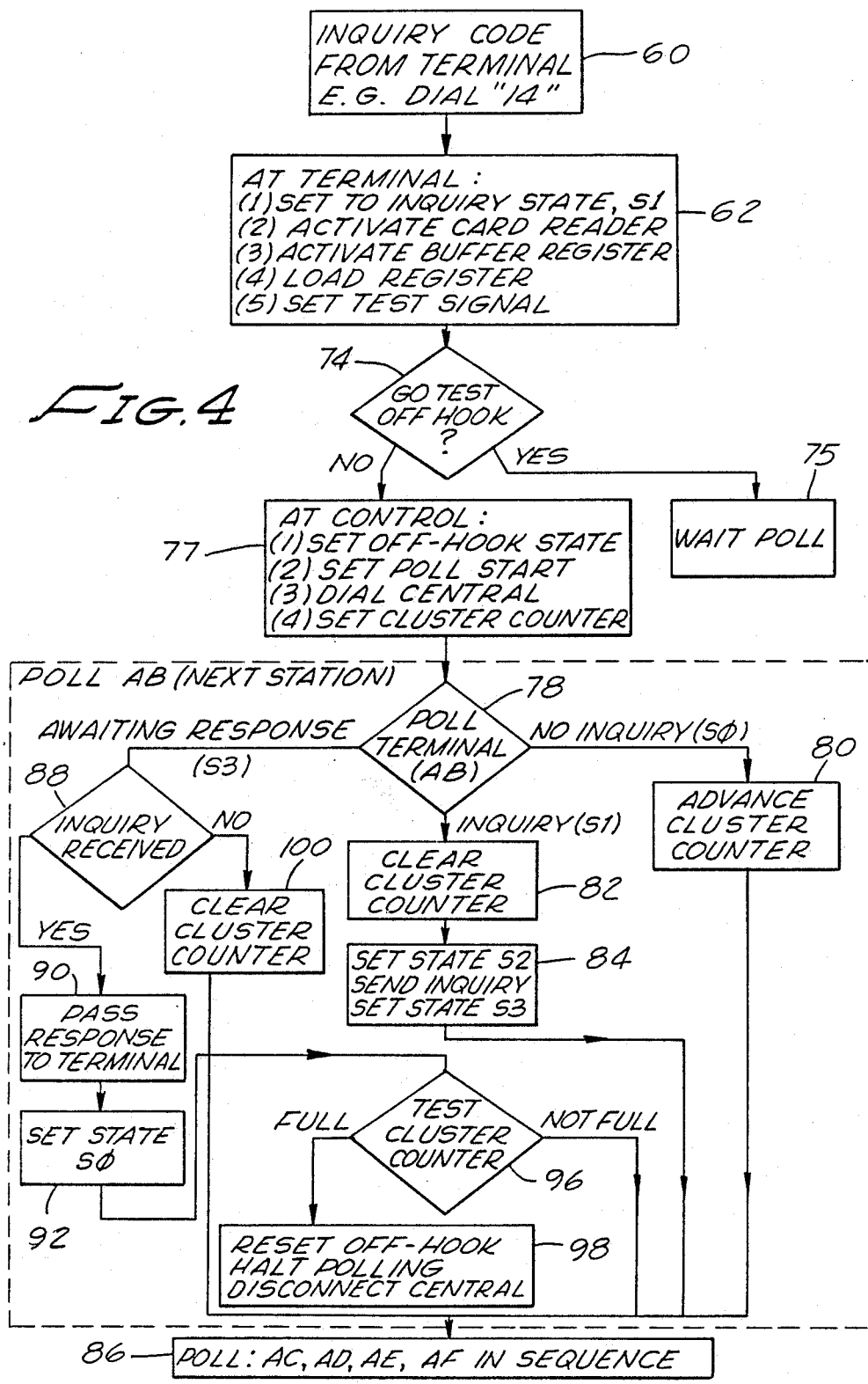

COORDINATED MULTIPLE TELEPHONE STATION SYSTEM

This is a continuation, of application Ser. No. 868,464, filed May, 30, 1986 now U.S. Pat. No. 4,715,061.

BACKGROUND AND SUMMARY OF THE INVENTION

The effective combination of data processing techniques with telephonic communication has greatly expanded the volume of telephonic digital communication. For example, a considerable volume of such traffic involves inquiries to central-computer data stations from which various information may be obtained. Specifically, for example, digital-data inquiries to data banks relating to the status of credit cards are commonplace. By conventional practice, pertinent identification information is sensed from a credit card at remote terminals to formulate digital signals constituting an inquiry to a central data station. Such signals are telephonically communicated to the central data station where relative information on the subject of inquiry is located and returned to the inquiring terminal. A display at the terminal may be used to advise the approval or dissapproval of a transaction under consideration. Thus, an operator at an inquiry terminal simply passes a credit card through a reading mechanism and seconds later he is able to view a display showing the status of a card tendered to support a contemplated transaction.

With the widespread use of telephonic inquiry systems, telephone economics have become exceedingly important, particularly where inquiry terminals are separated from a central data bank by a considerable distance. In that regard, consider credit inquiries to a remote data station from a large commercial facility, for example, a major metropolitan hotel. Such an establishment may have many telephone terminals from which credit card inquiries can be initiated. During peak business hours, several credit card inquiries may occur almost simultaneously from different terminals within the hotel. In the space of minutes inquiries might originate from different cashier stalls, restaurant facilities, bar facilities, transportation facilities and so on. In accordance with the conventional practice, each inquiry would involve a separate dialing operation, a separate dial-up and separate attendant charges.

Accommodating the economics of telephonic communication, charges for individual calls normally include a minimum. For example, long-distance calls routinely involve a minimum charge that is incurred on establishing communication between connected stations. Afterwards, a time-related rate is applicable. Such charge schedules, reflecting the economics of telecommunication, result in the cost of several separate calls being much higher than the charge if the same communications were accomplished during a single dial-up call. Accordingly, with respect to digital telephonic inquiries, substantial economy can result from concentrating multiple inquiries into a single call to result in a single dial-up charge. In general, the present invention involves recognizing the need for a system with such capability and developing the resulting system in accordance with available telecommunications.

In accordance with the present invention, several telephone inquiry terminals are integrated as a cluster. Normally the cluster will consist of telephones at a facility, each with access to a common extension line. Implementing the cluster is a transmit-receive unit, normally located remote from the cluster. The transmit-receive unit also interfaces a central data station in the system. Accordingly, the system may reduce the number of telephone lines, save time for inquiries through the cluster and reduce the number of calls for more economical operation.

To initiate an operating sequence within a cluster in accordance with the present invention, one of the telephone terminals may be actuated (taken "off-hook") to command dial-up and the resulting operation of the cluster system. Thereafter, in a continuing operation, the line remains "off-hook" to preserve the connection until all communication is complete. Then terminals assume a "listening" or standby mode. Accordingly, a polling format is established to accommodate transmission of multiple inquiries and responses from and to the individual terminals. The system facilitates such continued operation until all terminals are quiescent. The telephone line then is relinquished (going "on-hook") terminating the call.

As disclosed in detail below, the system hereof may be variously implemented using different signal formats, different data processing structures and different techniques. For example, various programming and polling techniques may be employed. Also, various forms of telephone sets, data readers, displays and registers may be incorporated in systems in accordance herewith.

BRIEF DESCRIPTION OF THE DRAWINGS

In the drawings, which constitute a part of this specification, exemplary embodiments of the invention are set forth as follows:

FIG. 3 is a diagrammatic representation illustrative of a data inquiry word as formulated and registered in the system of FIG. 1; and FIG. 4 is a logic diagram depicting the detailed operation of the system of FIG. 2.

DESCRIPTION OF THE ILLUSTRATIVE EMBODIMENT

As indicated above, a detailed illustrative embodiment of the present invention is disclosed herein. However, data sources, telephonic apparatus, display apparatus and so on in accordance with the present invention may be embodied in a wide variety of different forms, some of which may be quite different from those of the disclosed embodiment. Consequently, the specific structural and functional details disclosed herein are merely representative; yet in that regard, they are deemed to afford the best embodiment for purposes of disclosure and to afford a basis for the claims herein which define the scope of the present invention.

Figure 1:
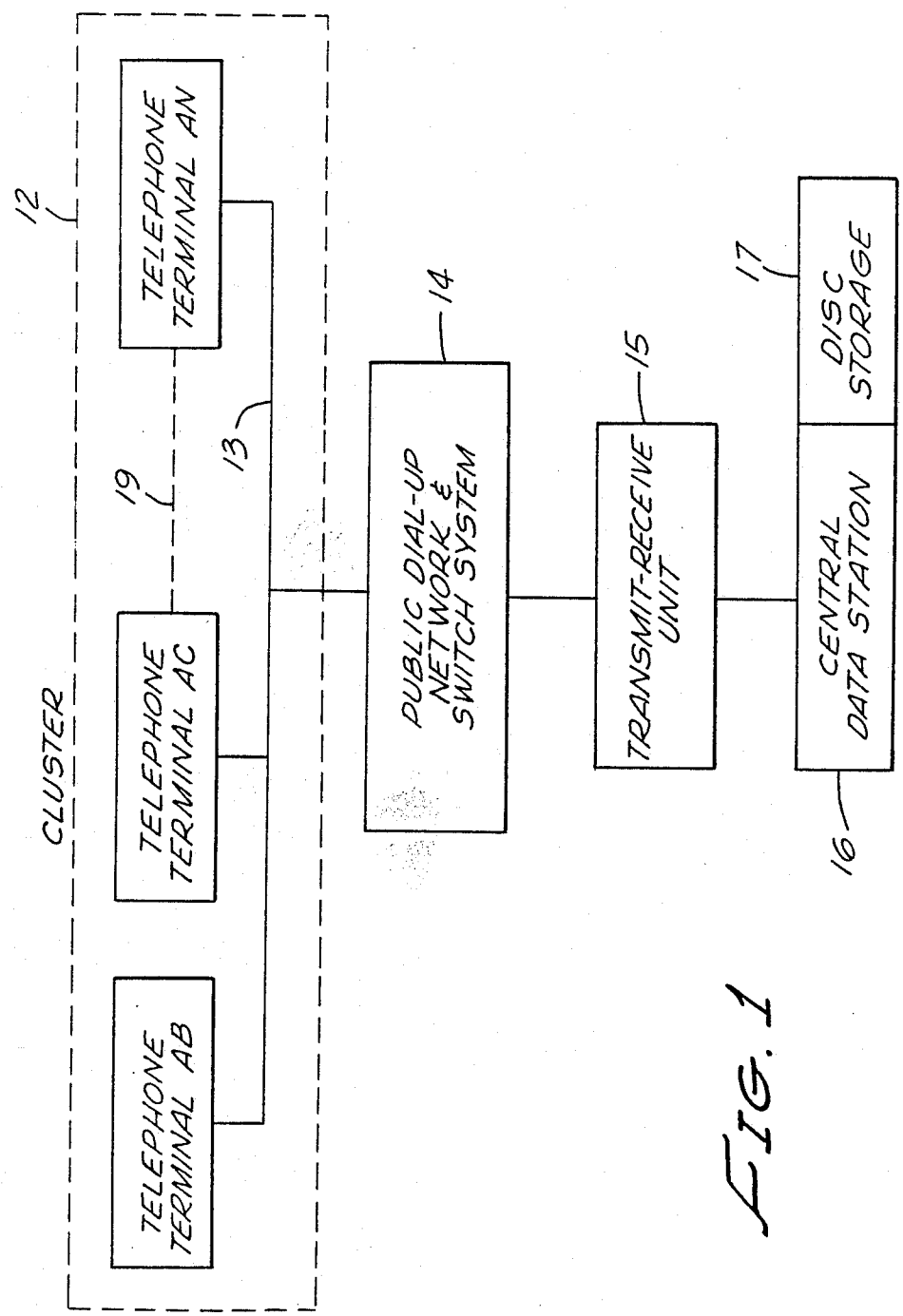
FIG. 1 is a block diagram of a coordinated system constructed in accordance with the present invention and illustrated in association with a public telephone system.

Referring initially to FIG. 1, a cluster 12 is illustrated embodying a plurality of telephone terminals. As described in detail below, the cluster 12 of terminals is connected to a public telephone dial-up network 14 essentially comprising an accessible telephonic communication system. Operating through the dial-up network 14, the cluster system 12 interfaces with a transmit-receive unit 15 and in turn, a central data station 16 incorporating a disc storage 17. Normally the cluster 12 will be located at a single facility, as a hotel or other extensive complex. The transmit-receive unit 14 might be located almost anywhere. However, in the illustrative embodiment, the unit is physically located with the central data station 16.

Note that telephone terminals in the cluster 12 are not dedicated for use exclusively in the system as illustrated nor is the transmit-receive unit 15 nor the central data station 16. Also, there are no dedicated telephone transmission lines involved.

The cluster 12 comprises a plurality of telephone terminals, any of which may operate through the public telephone network 14 and the transmit-receive unit 15 to communicate with the station 16. In accordance herewith, the transmit-receive unit 15 accepts inquiries from the individual terminals AB-AN (as well as others). The unit 15 polls the terminals AB-AN during each dial-up connection so as to efficiently process inquiries by utilizing each dial-up connection to a fuller extent and reducing the substantial economic penalty of multiple calls.

In the cluster system 12 of FIG. 1, telephone terminals AB, AC and AN are depicted. More generally, a multiplicity of various numbers of terminals is implied by a dashed line 19. The terminals AB-AN comprise telephone instruments with additional components as generally known in the art. Specifically, the terminals comprise extensions on a single calling line 13; however, they are individually addressable and include auxiliary communication structure. In typical embodiments of the system, the terminals AB-AN can be used as traditional telephones independent of the cluster operation.

As described in detail below, the operation at each of the telephone terminals AB-AN appears substantially conventional to operators at the individual terminals. Specifically, as indicated above, an operator might use the telephone in a conventional manner utilizing the public system 14. Alternatively, for communicating an inquiry to the central station 16, the operator simply keys in a select code, e.g. "1, 4" to indicate a desire for an inquiry to the central data station 16. As explained in detail below, the operator then loads in the inquiry data and the terminal goes "off hook", dials the transmit-receive unit 15 through which response data is subsequently provided from the central data station 16. Note that the transmit-receive unit 15 is essentially a telephone station reachable by dialing a specific number. The unit may serve any number of clusters, depending of course on the level of traffic.

In an exemplary operation, an operator at the terminal AB might press keys to set in data or move a credit card through a reader at a terminal to formulate signals representative of a specific inquiry. The inquiry is transmitted through the public network 14 and the unit 15 to the central data station 16. Almost immediately (in accordance with data processing capabilities) the station 16 selects data from the storage 17 to provide a response to actuate a display at the inquiring terminal AB. Should inquiries occur at other terminals, they are accommodated during a single "dial up" connection in accordance with the disclosed embodiment without any conscious awareness by the operators. Thus, communications are efficiently handled with increased economy.

Figure 2:
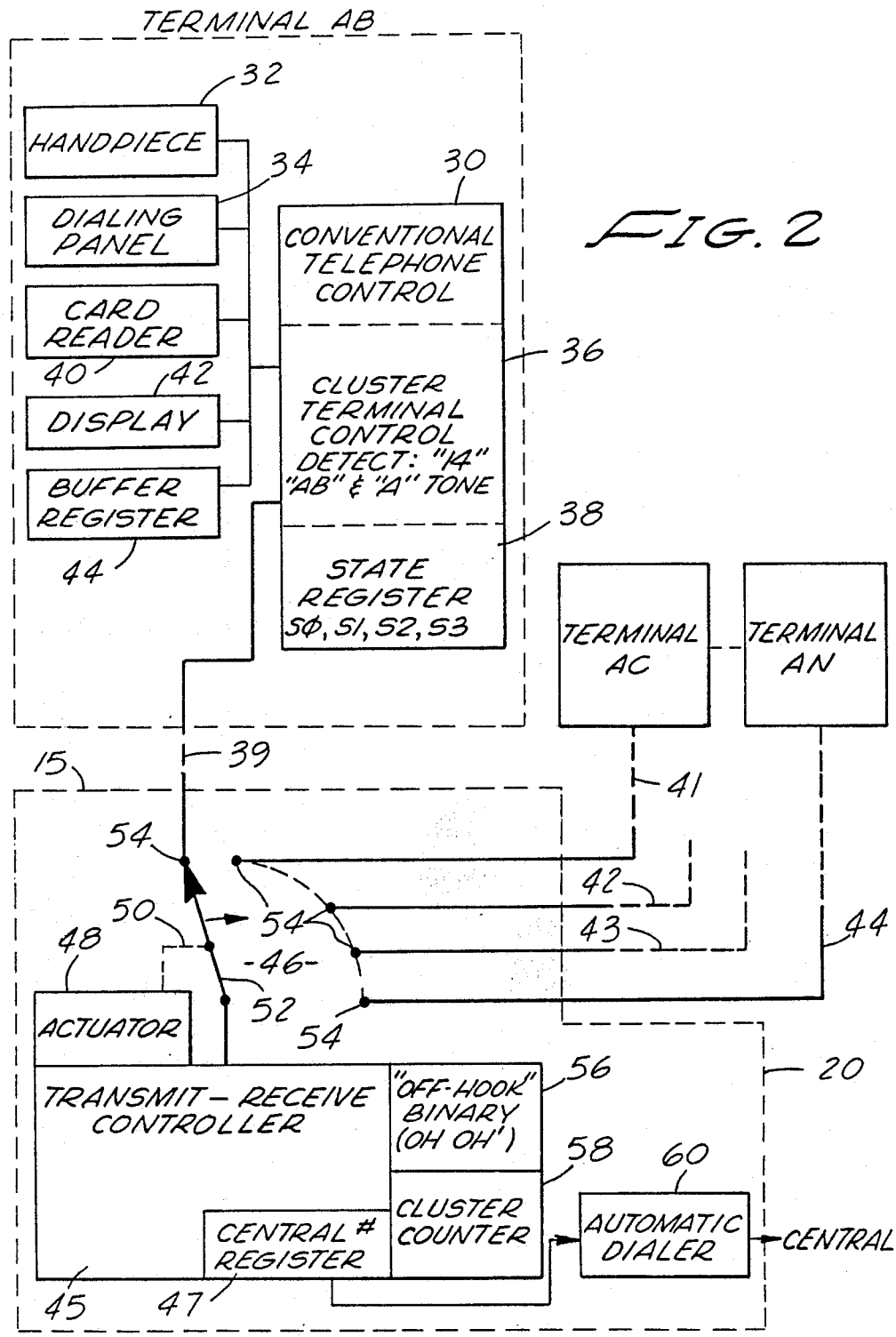
FIG. 2 is a block diagram of a cluster of terminals along with a transmit-receive unit, as illustrated in FIG. 1, showing the components in substantially greater detail.

Turning now to FIG. 2, the terminal AB and the transmit-receive unit 15 are shown in greater detail. Terminals AC-AN are similar to terminal AB and are symbolically represented rather than to be shown in detail.

The terminal AB includes the elements of a conventional telephone instrument and certain additional elements individually as well known in the prior art. Specifically, as illustrated in FIG. 2, the terminal AB includes a conventional telephone control 30 associated with a traditional telephone handpiece 32 and a traditional telephone dialing panel 34 (keyboard). The conventional control 30 is associatively connected with a cluster terminal control 36 and a terminal state register 38. These elements are activated on dialing a code "1, 4" to obtain a common line 13 (FIG. 1) for the cluster. These elements are activated upon the initiation of an inquiry and determine the need to call the unit 15 or join a call made by another terminal on the common line 13. The terminal AB also integrates a card reader 40, a display panel 42 and a buffer register 44. Forms of such components are well known in the prior art.

The cluster terminal control 36 is actuated by dialing the cluster line code "1, 4". On that occurrence, inquiry data is formulated, the control 36 provides the dial number for the transmit-receive unit 15 (FIG. 1), goes "off-hook" and dials for a connection to the unit 15. The cluster terminal control 36 then operates the terminal in the well known "point-to-point" telephone format with the transmit-receive unit 15. In that regard, the unit 15 is "master" while the terminal control 36 is "slave". In the relationship, as explained in detail below, each of the terminals AB-AN can be addressed by the transmit-receive unit 15 to operate in that format. Thus, the cluster terminal control 36 incorporates an address structure for detecting that its designating code AB has been received and responding accordingly for communication in a "point-to-point" functional relationship. The control also detects the standard telephone "A" tone as a DTMF signal, digitally indicating "hello" at a called station.

In FIG. 2, the terminal AB is depicted to be connected to the transmit-receive unit 15 through a dashed line 39 which in practice includes the public dial-up network and switch system 14 (FIG. 1). To simplify the drawing and the description, the public telephone system 14 interconnecting the terminal AB to the transmit-receive unit 15 is simply represented by the dashed line 39.

To further simplify the drawing and the description, the line 39 along with a rotary switch depicted in the transmit-receive unit 15 represent the well known electronic equivalent structure of an addressable common line or bus. The line 39, along with the lines 41, 42, 43 and 44 and a rotary switch 46 represent an equivalent functional structure in the form of a well known addressable data bus. The symbolic representative electromechanical structure simplifies the explanation of the system, which in a typical system would be a well known electronic apparatus in the form of an addressable data bus for selective communication between one of the terminals AB-AN and the transmit-receive unit 39. Thus, the transmit-receive unit 15 polls the terminals AB-AN.

Polling is by the rotary switch 46 which is represented as a parallel apparatus driven by an address actuator 48 which in turn is controlled by a transmit-receive controller 45. Note that the address or polling actuator 48 is connected to a movable contact 52 of the rotary switch 46 as designated by a dashed line 50. Accordingly, the actuator 48 drives the movable contact 52 (symbolic) to variously engage the individual stationary contacts 54 (symbolic) that individually couple lines 39, 41, 42, 43 or 44 to the terminals AB through AN. Thus, in the represented context, the rotary actuator 46 accommodates a plurality of individual lines from the individual terminals AB-AN to the cluster controller 45. As indicated, in an actual installation, a well known addressable bus structure would be employed to accomplish the same function with solid state electronics. However, illustrating and explaining such a structure would vastly complicate the disclosure.

From the movable contact 52 of the polling structure 46, connection is to the transmit-receive controller 45 which may take the form of a relatively simple computing chip integrating certain control and storage functions. The controller 45 incorporates an "off-hook" binary for registering either of two cluster states OH or OH' depending on whether or not the cluster 12 is active ("off-hook") or quiescent ("on-hook"). The controller 45 also incorporates a cluster counter 58 providing a count of the number of terminals AB through AN in a cluster.

The transmit-receive controller 45 is shown to be connected to an auto-dialer 60 through which the system communicates with the central data station 16 (FIG. 1). Of course, if the structures are at the same location, a direct connection may be employed. Accordingly, inquiries and responses are communicated to and from the central station 16 and the disc storage 17. Specifically, the controller 45 (FIG. 2) incorporates a station number register 47 storing the dial number for the central data station 16 (FIG. 1). Alternatively, leased line versions might be employed. On operation, the register 47 supplies the number to the dialer 60.

During periods of cluster operations, each of the individual terminals, as exemplified by the terminal AB, may have any one of four different states. The states are represented by the state register 38 which may take the form of a pair of binary units with the capability of specifying states S0, S1, S2 and S3. Specifically in the disclosed embodiment, the states are represented and designated as follows:

| State and Signal Designation | Terminal States Binary Value | Description |
|---|---|---|
| S0 | 00 | quiescent |
| S1 | 01 | "have inquiry" |
| S2 | 10 | "sending" |
| S3 | 11 | "waiting response" |

The registration and control of the individual states S0–S3 is treated below in detail. However, essentially, the states are accomplished by cooperative control functions of the cluster terminal control 36 and a transmit-receive controller 45 (FIG. 2, lower left).

The detailed structure and operation of the transmit-receive controller 45 as well as that of the individual terminals AB-AN now will become apparent with consideration of the program of operations as diagrammed in FIG. 4. Accordingly, a calling sequence will now be assumed and the resultant operations will be explained in detail with reference somewhat concurrently to the figures.

Assume, for example, that the illustrative cluster 12 (FIG. 1) is installed in a major hotel and is provided for various telephone uses including determining the acceptability of credit cards by communication with the central station 16 and disc storage 17. As indicated above, the individual telephone terminals AB-AN can be used independently of the cluster function and may involve lines other than the common calling line 13. Also, in the illustrative installation, the individual terminals AB-AN are equipped for cluster operation to check credit cards bearing a magnetic stripe in accordance with widespread convention. Accordingly, the terminals might be located at: cashier stations in the lobby, a restaurant, a club and so on.

Further with respect to the illustrative system, assume the transmit-receive unit 15 (also connected to the public system 14) is located along with the central data station 16 and the disc storage 17 at a service facility. Normally, the service facility will be remote from the cluster 12; however, not necessarily so.

Computerized data facilities, as represented by the station 16 (FIG. 1) are well known and are currently in use to accept telephonic inquiries and provide replies. Typical of such facilities, inquiries must include an identification of the calling station (for billing and other purposes) and a credit card number to identify the subject of an inquiry. In a digital format, the inquiry data prompts the central station 16 to search out the pertinent data on the subject, compose an advisory response and transmit the response back to the inquiring terminal in a digital format.

To pursue a sequence of operation for the disclosed embodiment, assume initially that the cluster 12 (FIG. 1) is in a quiescent state when an operator at the terminal AB (FIG. 2) desires to make an inquiry. To initiate an inquiry, the operator presses the proper key to designate the type of inquiry transaction desired. The operator signifies a desire to pursue a cluster inquiry by dialing the cluster code, e.g. "1, 4". Relating the sequence of operations to FIG. 4, a block 60 indicates initiating an inquiry transaction which is detected in the cluster terminal control 36 (FIG. 2) to produce certain attendant operations. Specifically, the terminal AB enters state S ("have inquiry"). The operations are indicated in block 62 (FIG. 4) along with several other concurrent operations. Occurrence of the state SI from any terminal AB-AN initiates a test of the common line to determine if a call central is in progress and if not, make a call to central. However, as indicated by the block 62 in FIG. 4, several preliminary operations are performed. Specifically, in addition to setting the terminal in state S1, the card reader 40 (FIG. 2) is activated along with the buffer register 44. The cluster control 36 stores a telephone dialing number for the transmit-receive unit 15 so as to dial that number when the time occurs. In that way, the cluster will be interconnected telephonically with the transmit-receive unit 15 for digital communication in a "point-to-point" format. However, before such an event, as indicated by block 62 (FIG. 4), the cluster terminal control 36 (FIG. 2) actuates the display 42 signaling the operator to pass the card through the reader 40 and to actuate the dialing panel 34 so as to compose the inquiry in the buffer register 44. Accordingly, with data from the card reader 40 and the panel 34, an inquiry word is formulated in the buffer register 44 as illustrated in FIG. 3. Specifically the fields of the word are composed as follows:

| Designation | Data | Source | Field or Block |
|---|---|---|---|
| AB | Terminal name | Control ROM | 64 |
| CL | Terminals in cluster | Control ROM | 66 |
| ST | Terminal telephone number | Control ROM | 68 |
| CN | Card number | Reader 40 | 70 |
| IQ | Inquiry | Reader 40 | 72 |
| ID | Code | Reader 40 | 74 |

Considering the inquiry word of FIG. 3 in greater detail, the terminal AB formulates an inquiry word as illustrated in FIG. 3 in the buffer register 44. Data components or fields of the word are shown in boxes with word descriptions above and signal designations below. In the disclosed embodiment, a binary signal format is used, however, for convenience of explanation, alphanumeric data is illustrated. The inquiry word as represented in FIG. 3 includes an initial block 64 designating the source terminal, e.g. terminal AB. The designations of signals for the terminals AB through AN coincide to the station names.

The next block 66 of the inquiry word carries data representative of the number of terminals in a cluster, e.g. "5" and is designated as the signal CL. This information is used by the transmit-receive unit 15 for polling the terminals of the cluster.

The block 68 carries the telephone number of the cluster station designated as signal ST and illustrated as "277-621-4835". This identifies the station, as for billing purposes.

The block 70 carries the card number of a subject under inquiry. The representative signal is designated CN and the illustrated card number is "44765342179". Thus, the subject of inquiry is identified.

Block 72 is employed to identify the nature of the inquiry, as by a specific code. The designated signal IQ is illustrated for example as "D1" which might specify an inquiry resulting from a transaction involving a check for between $50 and $100. Of course, a wide variety of other inquiry designations may be employed. In a related manner, the block 74 carries other inquiry information in the form of an inquiry code as represented by a signal ID. As illustrated, the signal ID represents "RLS7" which might be a further code for the inquiry or the terminal. The designated fields of the data word (FIG. 3) are converted to signals identified by similar designations. In that regard, for convenience, certain signals of the illustrative embodiment are summarized and defined as follows:

| Signal Designation | Data Represented |
|---|---|
| A | Answer signal |
| AB-AN | Identification of calling terminal in cluster sequence |
| CL | Number of terminals in cluster |
| CN | ID card number for inquiry subject |
| IQ | Inquiry designation |
| ID | Inquiry code |
| OH | "off-hook" state for cluster |
| OH' | "on-hook" state for cluster |
| ST | Station telephone number |
| S0 | Terminal state - quiescent |
| S1 | Terminal state - "have inquiry" |
| S2 | Terminal state - "sending" |
| S3 | Terminal state - "awaiting response" |
| Code "1, 4" | Dial code to select extension line |

Recapitulating to some extent, with the terminal AB actuated for cluster operation as explained above (set to inquiry state S1 as illustrated in block 62, FIG. 4) the operator employs the dialing panel 34 (FIG. 2) and the card reader 40 to set the inquiry word (FIG. 3) in the buffer register 44 (FIG. 2).

With the above operations complete, the terminal AB tests the status of the common line 13 (FIG. 1); that is, the common line may be either "in use" or "not in use." The test is performed as indicated in block 74 (FIG. 4). The test is simply whether or not a call is in progress or not with the transmit-receive unit 15 (FIG. 1). A "yes" response to the test prompts the inquiring terminal AB to await its turn in the polling sequence. See block 75 (FIG. 4). If a call is not in progress, the terminal goes "off hook" and dials central. With a telephonic connection established with transmit-receive unit 15 (FIG. 1), the terminals AB-AN are treated sequentially in "multipoint" fashion using the well known "master-slave" format. Specifically, the unit 15 polls the terminals AB-AN in sequence to determine the state of each terminal. If the terminal indicates a state that can be advanced under the existing circumstances, the unit 15 proceeds in that regard. Otherwise, the unit 15 proceeds to poll the next unit in the sequence AB-AN.

Returning to the exemplary operating sequence, assume for the present that terminal AB is the only active terminal in the cluster and accordingly the "line in use" test is negative. The terminal AB then takes the common line 13 (FIG. 1) "off hook" and dials the transmit-receive unit 15 to signal that it has an inquiry. At the transmit-receive unit 15 the call is "answered" with an "A" tone that is detected by the terminal cluster control 36 to shift the terminal to state S2 (sending inquiry). Thus, the formulated data word (FIG. 3) is sent to the transmit-receive unit 15 and forwarded to the central data station 16 (FIG. 1) for interrogating the disc (FIG. 1) storage 17. The central station number is dialed from the register 47.

After sending the inquiry data word, the control 36 at the terminal AB (FIG. 2) goes into the state S3 and the rotary switch 46 is actuated to poll the next terminal. Note that the number of terminals AB-AN in the cluster sets the cluster counter 58 to overflow on that count. Also the fact that the cluster is "off-hook" is registered by the binary 56.

As the initial inquiry station in the above example, the station AB has its inquiry. However, consider other possibilities. When the polling structure 46 communicates with the next terminal in sequence, e.g. terminal AC, any of three possibilities may exist as represented by the decision block 78 of FIG. 4. The polled terminal AC may have an inquiry to be sent as indicated by the state S1. The terminal may have no inquiry, state S0, or the terminal may have sent an inquiry and be awaiting a response (state S3). The operations responsive to each of these possibilities will now be considered.

Initially consider the situation in which the polled terminal has an inquiry and is set in state S1. As indicated by a block 82, the cluster counter 58 (FIG. 2) is cleared to zero on encountering a terminal in the state S1. As explained in detail below, this assures that the polled terminal will have an opportunity to receive a response to its inquiry during a present dial-up.

The next step (block 84, FIG. 4) represents the cluster terminal control 36 sending the inquiry word. Specifically, acting through the rotary switch 46, the terminal is set in state S2 and the inquiry word is transmitted from the register 44 to the central data station 16 (FIG. 1). The terminal AB then is placed in the state S3 (awaiting response). With such operations complete, the system proceeds as illustrated in FIG. 4 with the operation of the block 86, i.e. continuing the polling sequence which is represented in FIG. 2 by stepping the switch 46.

Assume, for example, that in the polling sequence, the next terminal is in a quiescent state. The state is manifest through the switch 46 to the transmit-receive controller 45 with the consequence that the cluster counter 58 is advanced as illustrated by the block 80 (FIG. 4). Thereafter, the movable contact 52 of the switch 46 simply moves to the next terminal by engaging the next stationary contact 54.

As the polling continues, if an operator at a terminal has formed an inquiry, the state S1 is detected with the result that the operations described above for terminal AB are repeated resulting in the transmission of another inquiry word. Again, the cluster counter 58 (FIG. 2) is cleared assuring the polling will continue sufficiently to enable a response to the inquiry from the terminal AF. Thus, inquiries and responses are transmitted and received in an organized polling format.

Assume now that the testing returns to the terminal AB with the movable contact 52 of the switch 46 engaging the stationary contact 54 of the terminal AB (FIG. 2). As a consequence, the terminal AB provides a signal S3 to the controller 45 indicating the terminal AB is awaiting a response. The resulting sequence of operations is diagrammed in FIG. 4 (left). First, a decision block 88 indicates a test in the controller 45 to determine whether or not the inquiry response has been received and is stored. If the response is stored in the controller 56, it is returned to the control 36 (FIG. 2) as indicated by the block 90 (FIG. 4). As a result, the response is displayed by the display 42 at the terminal AB. Also, the state register 38 in the terminal AB is set to state S0 (quiescent) as indicated by the block 92 (FIG. 4).

With the inquiry of terminal AB answered, the system proceeds to determine whether or not the polling should be terminated. Specifically, the logical question is whether or not during the last polling all the terminals are in a quiescent state. The test involves the cluster counter 58 (FIG. 2) as indicated by the decision block 96 (FIG. 4). Specifically, has the cluster counter reached the number of terminals registered for the cluster? Essentially, the cluster counter 58 tallies quiescent states of terminals as polled until a sequence is encountered that coincides to the terminals in the cluster involved. The controller 45 then disconnects the cluster setting the binary 56 to indicate not "off-hook".

Note that in the above example, if the inquiry for the terminal AB had not been received (see query block 88, FIG. 4), then the cluster counter 58 (FIG. 2) would again be cleared as represented by the block 100 (FIG. 4). As a result, the polling operation would continue for at least one more cycle. However, as indicated, when the cluster counter is found to be full, it indicates that all terminals were quiescent during the last polling cycle and accordingly the communication is terminated.

From the above, it may be seen that the polling operation continues so long as one of the terminals manifests an active state with the consequence that numerous inquiries may be accommodated during a single dial-up connection to the central station 16 (FIG. 1). Therefore, the economy of multiple inquiries during a single call is accomplished. A specific sequence of operations for the cluster might occur somewhat as follows:

| | Terminal Involved | Communication | Source |
|---|---|---|---|
| (1) | AB | have inquiry (S1) | terminal AB |
| (2) | AB | transmit | controller 45 |
| (3) | AB | AB, cluster of 5, inquiry (S2) | terminal AB |
| (4) | AB | state (S3) | terminal AB |
| (5) | AB | stand by | controller 45 |
| (6) | AC | poll | controller 45 |
| (7) | AC | no inquiry (S0) | terminal AC |
| (8) | AD | poll | controller 45 |
| (9) | AD | no inquiry (S0) | terminal AC |
| (10) | AE | poll | controller 45 |
| (11) | AE | no inquiry (S0) | terminal AE |
| (12) | AF | poll | cohtroller 45 |
| (13) | AF | AB, cluster of 5, inquiry (S2) | terminal AF |
| (14) | AF | state (S3) | terminal AF |
| (15) | AF | stand by | controller 45 |
| (16) | AB | response word | controller 45 |
| (17) | AC | poll | controller 45 |
| . | . | . | . |
| . | . | . | . |

(On polling five terminals without activity = go "off-hook", i.e. disconnect from cluster of terminals in preparation of receiving an inquiry from another terminal or cluster.)

Pursuing the chart, consider the initial sequence of events. The terminal AB is actuated by the operator dialing a code, e.g. "1, 4", to activate the cluster calling sequence. In that situation, the terminal AB is in a state S1, i.e. "have inquiry". The operation is indicated by the first line of the above tabulation.

As explained above, upon the occurrence of a terminal with an inquiry, the transmit-receive unit 15 is telephoned and activated to receive an initial inquiry from the active terminal. After receiving the inquiry, the controller 45 begins polling.

The system proceeds to poll other stations until as indicated with the polling of terminal AF, an inquiry is indicated. The inquiry is taken and the system proceeds until the terminal AB is again polled and the response is delivered. Thus, the system polls the terminals until a condition is detected in which all terminals are quiescent. With that occurrence the system returns to the inactive state with the off-hook binary 56 reset (FIG. 2).

Of course, other detailed features may be incorporated as will be apparent to one skilled in the art. For example, various components can be put on a time schedule that will abort operations after a lapse of uneventful time. Generally, communications in the system utilize DTMF signals which eliminate the need for a carrier frequency with the result that the system hereof is simple and inexpensive.

The telephone terminals of the cluster are all capable of listening on the line in high impedance mode. After one of the terminals goes "off-hook" to communicate with the transmit-receive unit, the signal strength is not affected by the line loading of the other terminals. The required 600 ohm impedance is maintained.

Thus, in view of the above description, it will be apparent that the disclosed embodiment incorporates a number of telephone terminals which are operated in a cluster to accommodate several current inquiries (and responses) occurring within the time frame of a single call. Consequently, considerable economy results. In that regard, recognizing the significance of certain key aspects of the system, it is to be understood that a wide variety of techniques and apparatus may be employed depending on the objectives involved and the nature of the inquiries or other communications to be transmitted. Accordingly, the scope hereof is deemed to be appropriately determined by the claims as set forth below.

What is claimed is:

1. A cluster calling system for use with a multiple-terminal telephone network to contact and interface a central data station for possible multiple inquiries during a single interconnection to said central data station, comprising:

at least one cluster of telephone terminals adapted to be connected for accessing a call line of said multiple-terminal telephone network, said terminals including means to formulate data signals for inquiries;

at least one transmit-receive unit adapted to be connected to said multiple-terminal telephone network for individually interfacing said cluster of telephone terminals through said multiple-terminal network and adapted to be coupled to said central data station, said transmit-receive unit further including means operable upon an interconnection communication with said cluster to poll each of said telephone terminals in said cluster for the existence and communication of data signals manifesting an inquiry to said central data station and to terminate communication with said cluster upon completion of a poll sequence of said telephone terminals absent the existence of data signals manifesting an inquiry to said central data station.

2. A calling system according to claim 1 wherein said transmit-receive unit further includes a cluster counter means for registering the terminals in a cluster to tally the polling of said terminals and to terminate a multiple-terminal communication.

3. A calling system according to claim 1 wherein said transmit-receive unit further includes means to poll said telephone terminals in sequence until said terminals are indicated to be clear of data signals manifesting an inquiry to said central data station.

4. A calling system according to claim 2 further including means to poll said terminals in sequence until said terminals are indicated to be clear of data signals manifesting an inquiry to said central data station.

5. A calling system according to claim 1 wherein said terminals each include a state register means for indicating a present state of operation with regard to inquiries at said terminal.

6. A calling system according to claim 1 wherein said terminals include a card reader for sensing signal data from a card.

7. A calling system according to claim 1 wherein said terminals include a display unit for exhibiting data from said central data station.

8. A calling system according to claim 1 wherein said terminals include a register means for containing an inquiry word to be transmitted to said central data station.

* * * * *